A. T. DAWSON & G. T. BUCKHAM.
SIGHTING APPARATUS FOR ORDNANCE.
APPLICATION FILED MAY 6, 1911.
1,040,162.
Patented Oct. 1, 1912.
2 SHEETS—SHEET 2.
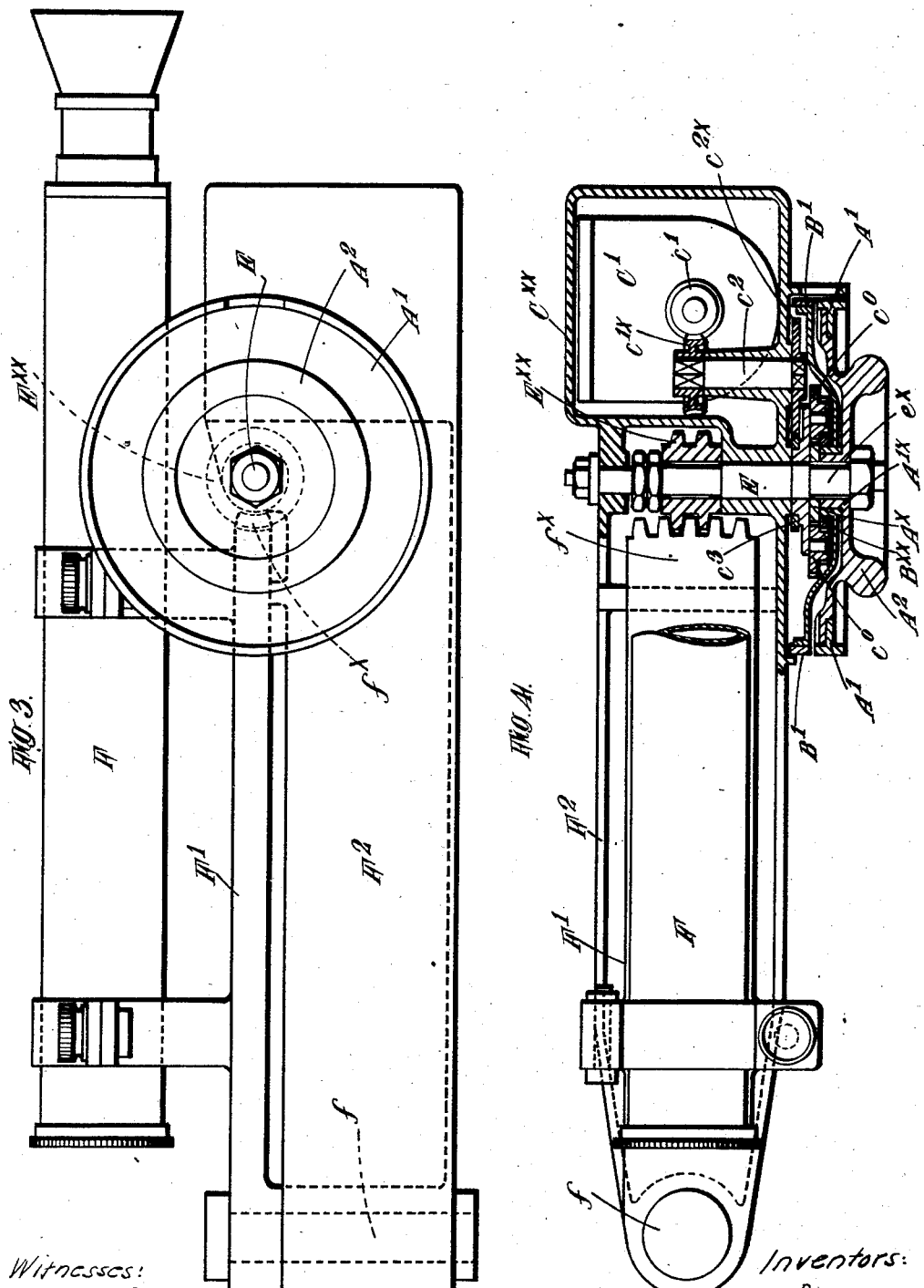
Witnesses:
Inventors:
Arthur Trevor Dawson
& George Thomas Buckham

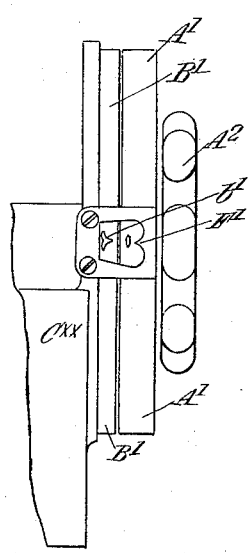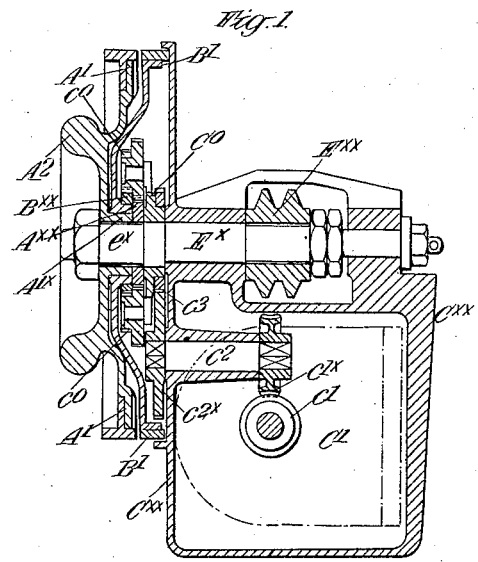

UNITED STATES PATENT OFFICE.

ARTHUR TREVOR DAWSON AND GEORGE THOMAS BUCKHAM, OF WESTMINSTER, LONDON, ENGLAND, ASSIGNORS, BY MESNE ASSIGNMENTS, TO VICKERS, LIMITED.

SIGHTING APPARATUS FOR ORDNANCE.

1,040,162.  Specification of Letters Patent.  Patented Oct. 1, 1912.

Original application filed April 5, 1910, Serial No. 553,554. Divided and this application filed May 6, 1911. Serial No. 625,527.

*To all whom it may concern:*

Be it known that we, ARTHUR TREVOR DAWSON, knight, and GEORGE THOMAS BUCKHAM, both subjects of the King of Great Britain, residing at 32 Victoria street, Westminster, in the county of London, England, have invented certain new and useful Improvements in Sighting Apparatus for Ordnance, of which the following is a specification.

This invention relates to sighting apparatus of the kind already proposed by us in which a traveling range pointer is actuated through worm gearing by an electric motor controlled from a distant station whence the information relating to the sighting is transmitted, the movements of the pointer being followed by angularly displacing a graduated range dial or drum, or an index, operated by the movement of the sighting apparatus during its elevation or adjustment by hand through the intervention of the usual rack and pinion arrangement. Apparatus of this kind has been disclosed in the specification of the prior U. S. Patent No. 863,593 already granted to us. We have also disclosed an arrangement in connection with the aforesaid apparatus in which the electric motor is inclosed in a casing that is capable of angular displacement about the axis of the range dial for enabling corrections to be made in the indications to compensate for variations in muzzle velocity, temperature of charges etc., such an arrangement being disclosed in the specification of our prior U. S. Patent No. 913,705.

The object of this invention is to provide a modification of the apparatus set forth in the specification of our application for Patent Serial Number 553,554 in which, instead of following the movements of the pointer by angularly displacing the range dial or drum, the pointer after being angularly displaced by the motor to any desired extent, is brought back to the zero or starting position of the sight by a corresponding angular displacement of the range dial or drum, thereby setting the sight.

According to the present invention we mount the motor on a stationary portion of the sight, and so connect the said stationary motor with the pointer that the act of setting the sight causes the pointer to be returned to its zero or starting position.

In order that our said invention may be clearly understood and readily carried into effect we will describe the same more fully with reference to the accompanying drawings, in which:—

Figure 1 is a vertical section, Fig. 2 is an elevation of a constructional form of the invention, Fig. 3 is a side elevation; and Fig. 4 is a plan of sighting apparatus provided with said constructional form of the invention.

The drawing shows our improvements by way of example in connection with the deflection receiver, but they are of course equally applicable to the range receiver. The motor $C'$ is secured to the casing $C^{xx}$ which forms a stationary part of the sight and the worm $c'$ of the motor gears with a worm wheel $c'^x$ which is mounted at one end of a shaft $c^2$. The outer end of the said shaft carries a pinion $c^{2x}$ which gears with a pinion $c^3$ secured to a disk $C^\circ$ carrying a number of planet pinions $c^\circ$ each of which has two sets of teeth of different diameters. The pointer is in this construction in the form of a drum $B'$ having an arrow mark $b'$ on its periphery, and the index mark is in the form of a gate $F'$ attached to the aforesaid casing $C^{xx}$. The graduated drum $A'$ is integral with a hand wheel $A^2$, and is provided with a boss $A'^x$ which is mounted on the squared end $e^x$ of the shaft $E^x$ carrying the usual deflection worm $E^{xx}$. Mounted on the said squared end $e^x$ is a pinion $A^{xx}$, which gears with the teeth of the larger diameter of the aforesaid planet pinions $c^\circ$. The periphery of the boss $A'^x$ forms a bearing for the pointer drum $B'$ to which is secured a pinion $B^{xx}$, the said pinion engaging with the teeth of the smaller diameter of the aforesaid planet pinions $c^\circ$.

The movements of the motor $C'$ are transmitted by means of the worm gearing $c'$, and $c'^x$ and the pinion $c^{2x}$ to the pinion $c^3$ which is as aforesaid secured to the disk $C^\circ$ carrying the planet pinions $c^\circ$. These planet pinions gear with the aforesaid pinions $A^{xx}$ and $B^{xx}$ and as the former, which is mounted on the shaft $E^x$, remains stationary during this operation, the pinions $c^o$ are rotated and by reason of their different diameters movement is imparted to the pinion $B^{xx}$ and the pointer drum $B'$. During the hand operation to bring the arrow $b'$ of the drum $B'$ to the index mark, the hand wheel $A^2$ is actuated and with it of course the graduated drum $A'$. Owing to the fact that the boss $A'^x$ is mounted on the squared end $e^x$ of the shaft $E^x$, the latter will be rotated; consequently the pinion $A^{xx}$ will rotate and will revolve the planet pinions $c^o$ gearing therewith, the disk $C^o$ being held stationary by the worm gearing $c'$ $c'^x$. The pinions $c^o$ which as aforesaid gear with the pinion $B^{xx}$, will actuate the latter, and cause the drum $B'$ to be rotated. This operation therefore causes the graduated drum $A'$, and the pointer drum $B'$ to be angularly displaced, and at the same time the worm $E^{xx}$ imparts the necessary deffection to the sight. Obviously differential gear of the kind above described can be employed in connection with the range dial or drum and the range pointer.

In Figs. 3 and 4, F represents the sighting telescope and $F'$ the carrier which is connected to the bracket $F^2$ by the deflection pivot $f$. The said carrier is provided with a worm wheel segment $f^x$ with which the aforesaid worm engages.

The graduated dial or drum is not absolutely necessary for the purpose of our present invention but is provided so that it may be used for setting the sight in the event of the electrical function becoming for any reason inoperative. The graduated drum $A'$ when employed is preferably covered by suitable means during the normal operation, and is adapted to be uncovered only if the electrical function fails.

What we claim and desire to secure by Letters Patent of the United States is:—

1. In sighting apparatus for ordnance, the combination with the sight, the means for setting the sight, and the pointer, of an electric motor mounted on a stationary part of the apparatus, means for connecting said motor with the pointer, and means whereby the setting of the sight causes the said pointer to return to its zero or starting position.

2. In sighting apparatus for ordnance, the combination with the sight, the means for setting the sight, and the pointer, of an electric motor mounted on a stationary part of the apparatus, means for connecting said motor with the pointer, a drum contiguous to which said pointer moves, and means whereby the setting of the sight causes the said pointer to return to its zero or starting position.

3. In sighting apparatus for ordnance, the combination with the sight, the means for setting the sight, and the pointer, of an electric motor mounted on a stationary part of the apparatus, means for connecting said motor with the pointer, a drum contiguous motor with the pointer, a drum contiguous to which said pointer moves, and means whereby the setting of the sight causes the said drum and the pointer to be displaced to return the latter to its zero or starting position.

In testimony whereof we affix our signatures in presence of two witnesses.

ARTHUR TREVOR DAWSON.
GEORGE THOMAS BUCKHAM.

Witnesses:
HENRY KING,
ALFRED PEAKS.

---

Copies of this patent may be obtained for five cents each, by addressing the "Commissioner of Patents, Washington, D. C."